(12) United States Patent
Hett et al.

(10) Patent No.: US 8,397,074 B2
(45) Date of Patent: Mar. 12, 2013

(54) METHOD AND COMPUTER SYSTEM FOR LONG-TERM ARCHIVING OF QUALIFIED SIGNED DATA

(75) Inventors: Christian Hett, Niddatal (DE); Jerry John Artishdad, Karben (DE)

(73) Assignee: Artec Computer GmbH, Karben (DE)

( * ) Notice: Subject to any disclaimer, the term of this patent is extended or adjusted under 35 U.S.C. 154(b) by 131 days.

(21) Appl. No.: 13/000,798

(22) PCT Filed: Jul. 8, 2009

(86) PCT No.: PCT/EP2009/058657
§ 371 (c)(1),
(2), (4) Date: Dec. 22, 2010

(87) PCT Pub. No.: WO2010/003975
PCT Pub. Date: Jan. 14, 2010

(65) Prior Publication Data
US 2011/0099388 A1    Apr. 28, 2011

(30) Foreign Application Priority Data
Jul. 8, 2008  (DE) .......................... 10 2008 031 890

(51) Int. Cl.
*G06F 21/00* (2006.01)
(52) U.S. Cl. .................. 713/180; 713/178; 713/193
(58) Field of Classification Search .................. None
See application file for complete search history.

(56) References Cited

U.S. PATENT DOCUMENTS

| | | | |
|---|---|---|---|
| 6,895,507 B1 * | 5/2005 | Teppler | 726/19 |
| 6,978,366 B1 * | 12/2005 | Ignatchenko et al. | 713/166 |
| 7,685,425 B1 * | 3/2010 | Wright et al. | 713/176 |
| 2003/0056108 A1 | 3/2003 | Mont et al. | |
| 2007/0219948 A1 | 9/2007 | Bugovics | |
| 2009/0287931 A1 | 11/2009 | Kinsella | |

FOREIGN PATENT DOCUMENTS

| | | |
|---|---|---|
| DE | 102006025369 A | 6/2007 |
| WO | 2008061389 A | 5/2008 |

OTHER PUBLICATIONS

Menezes, A et al, "Hash Functions and Data Integrity" *Handbook of Applied Cryptography* Oct. 1, 1996 p. 321-383 http://cacr.math.uwaterloo.ca/hac/.

Blazik, J et al "Long-term trusted preservation service using . . . " *Computer Standards and Interfaces* Feb. 2, 2007 vol. 29, No. 3 Elsevier Sequoia, Lausanne, CH.

* cited by examiner

*Primary Examiner* — Minh Dinh
(74) *Attorney, Agent, or Firm* — Andrew Wilford

(57) ABSTRACT

The current invention describes a method for long term archiving of qualifiedly signed data in accordance with the current invention, which comprises the steps of hashing the data, encrypting the data through a cryptography algorithm, hashing the encrypted data, signing the hashed data with an advanced time stamp, generating a hash tree over the whole data file or the subgroups thereof and signing the hash tree(s) with a qualified time stamp. Furthermore, a computer system for conducting the method is disclosed.

15 Claims, No Drawings

METHOD AND COMPUTER SYSTEM FOR LONG-TERM ARCHIVING OF QUALIFIED SIGNED DATA

CROSS REFERENCE TO RELATED APPLICATIONS

This application is the U.S. national phase of PCT application PCT/EP2009/058657, filed 8 Jul. 2009, published 14 Jan. 2010 as WO2010003975, and claiming the priority of German patent application 102008031890.6 itself filed 8 Jul. 2008, whose entire disclosures are herewith incorporated by reference.

The invention relates to a method for long-term archiving of data, which are qualifiedly signed to ensure the ability to provide evidence, as well as a computer system to carry out this method. The method in accordance with the current invention designs the storage in a way such that the legal validity of the data remains intact over a longer time period by renewing the signatures.

With the progress of the "paperless offices" and the more and more often occurring situations, where documents in business or private sections having a statutory period of retention of 30 years or more no longer exist or no longer exist exclusively in printed form, but rather in the form of electronic data, there arises increasingly a need for a legally valid storage possibility for the produced data. Since documents in electronic form can easily be modified, measures must be taken to ensure that the archived data are in their original condition.

The legislator has connected strict sanctions to such documents, so that such they can be served as evidence in court. With the signature law (SigG) and the signature ordinance (SigV), the German legislator has implemented the regulation 1999/93/EG (signature regulation) of the European Union, which regulates the application of electronic signatures. According to the regulation, an electronic document which is furnished with a qualified electronic signature is deemed as equated with a written form. The qualified electronic signature has essentially the same legal effect as the handwritten signature. In this way, signed documents, such as emails or electronic bills, are used as evidence just as their counterparts in paper form in front of court.

In contrast to paper documents with signature, electronic signatures, however, lose their legal validity after a certain period of time. For the creation of the signatures, cryptography algorithms are used, which are held as forgery safe only for a limited period time due to the advancing computer development and the accompanying increasingly better cryptoanalysis.

In general, a so called "hash value" is calculated out of the document to be signed using a hash function. A hash function is a kind of fingerprint of the document concerned, wherein the hash function features a one way characteristic and collision resistance. This means that, from a document of any size, a small value of defined size is calculated, which allows inferences to amendments of the document, because two different documents always provide explicitly different hash values (collision resistance) and the original document cannot be recalculated out of the hash value (one way characteristic). Subsequently, the hash value obtained in such a way is encrypted with a secret, private key, tied with a time stamp of the current time and furnished with the signature of the time stamp service. To archive the data, the signature data can be either stored separately from the original data, or attached to the original data. A further possibility presents itself in the application of container data (for example, PKCS#7, etc.), which contain not only the original data but also the signature data and possibly further information of the signature. If after certain period of time, the employed hash algorithm and/or cryptography algorithm can be burst through the improved computer power or new mathematic knowledge, the signed data can be manipulated retroactively. As a result, a period of validity for such algorithms is determined by the German regulatory office for telecommunications and post (RegTP).

In order to secure the legal validity of the archived data, the time limit of the algorithm that is fixed in the signature ordinance has to be prolonged through proper measures, wherein the signature ordinance purports the corresponding measures itself. According to the ordinance, "the data before the time point, when the eligibility of the algorithm or the associated parameter expires, is to be furnished with a new qualified electronic signature. The signature has to be done with the appropriate new algorithms or the associated parameter, must include the earlier signatures, and has to carry a qualified time stamp."

There arises a problem for the user that he, on the one hand, has to supervise the validity of the signatures, and on the other hand, has to obtain a new signature, when necessary. Since according to the signature law and the signature ordinance, the issuing of qualified electronic signatures is associated with safety related minimum standards for the computer centers and the corresponding provider can only be permitted after close examination, the qualified signature service is throughout a matter of service with costs. For each obtained qualified signature, there is a cost factor. If, for example, all emails should be archived in a firm, an economically considerable amount of money can be summed up.

There are known methods for generating hash values and hash trees as well as methods for preparing time stamps in state of the art. An immense amount of expenditure is due to the costs for a qualified time stamp, which alone ensures the legal validity of data, given the high daily need for data to be secured, such as emails, electronic bills, faxes, printed documents, etc.

DE 10 2006 025 369 B4 discloses a method and a device for securing the integrity and/or non-repudiability of frame based, time critical communication. Thereby, a fixable number of frames is integrated with an interval and the intervals are concatenated with each other for the application of technical digital safety methods. The applied technical digital safety methods can also comprise the addition of an electronic signature or an electronic time stamp.

The technical object of the current invention is to provide a device and a method for legally compliant storage of electronic data, which significantly reduces the amount of the qualified time stamps to be obtained and hence the costs of the methods in comparison with the standard procedures.

The object is achieved by the method for long term archiving of qualifiedly signed data in accordance with the current invention, which comprises the steps of hashing the data, encrypting the data through a cryptography algorithm, hashing the encrypted data, signing the hashed data with an advanced time stamp, wherein the signature comprises both a hash value of the original data and a hash value of the encrypted archive data, generating a hash tree over the whole data stock or the subgroups thereof and signing the hash tree(s) with a qualified time stamp.

The basic idea behind the invention is that the number of the necessary qualified time stamps is reduced by the way that they are replaced by advanced time stamps in a determined time interval, which are then validated for the predetermined time interval via a qualified time stamp. In this way, the stamp marking of all of the data can, for example, take place with free advanced time stamps, which are then jointly validated with a qualified time stamp. Thus only one stamp with costs is necessary every day.

Since the advanced time stamp is signed in a hash tree combined with the qualified time stamp, the date of the day with higher authenticity is secured for these stamped data. The time of the advanced stamp does not meet the requirements of the high demands on the legal certainty in the meaning of the signature law (SigG) or the signature ordinance (SigV), however, since the stamps are additionally furnished with qualified stamps, they are in principle also granted a higher authenticity than the exclusively advanced time stamp.

Moreover, for most of the legal questions, only the secured dates are important rather than the exact time.

The current invention is described in more details in the following. At first, the data are hashed by a hash function. In a preferred embodiment, multiple hash values are created simultaneously with a selection of more than one, preferably 2-10, more preferably 5-7, hash algorithms. These hash algorithms are selected in a way such that they can still be categorized as safe for as long a time as possible. In this way, the hash values are created quasi as stock, so that in case the hash algorithm, which is used for the signature, is later categorized as not safe, the archived data do not have to re-accessed, but rather the next valid hash value in the stored hash values can be used. In an ideal situation, all of the stamps needed for the storage time can be used from the hash value stock without the original data having to be revised again.

Subsequently the hash value is signed with an advanced time stamp. This can either take place in the archive system, which is then furnished with a corresponding device with an internal clock, a connection to an external reference time (such as a receiver for the DCF77 signal) and a corresponding signature software, or over an external time stamp server, wherein the access to this server can take place both over a LAN and over a WAN. Hash trees are established from the hash values obtained in this way. The trees can cover the entire archive file or only a subset thereof, preferably the new data which are newly added in the interval in each of these subsets. In an especially preferred embodiment, the hash tree data are collected in a binary file, which enables an easy and fast navigation in the data through, e.g. mathematic operation (fixed bit length of the entries). At the end of the pre-determined time intervals, the signing of the established hash tree takes place via a qualified time stamp. The request for the qualified time stamps can take place at the qualified signature service provider through the archive system itself, or through the server, which is also responsible for the issuing of the advanced signature.

In an advantageous embodiment of the current invention, the request for the qualified signature is bundled via the server for multiple archive clients, so that only one stamp is necessary for all clients all together, which once again reduces the costs. In a further advantageous embodiment of the current invention, the signed hash tree files are stored in the archive exactly as the archived data, such as, e.g., pseudo-emails. In this way, it is easily possible to newly sign the hash tree data according to requirements by just hashing them together with the daily data.

In a further advantageous embodiment, the signatures are examined by the archive system for their validity and are re-sent for signing in time before expiration. It is especially preferred when the data are encrypted with the help of a cryptography algorithm. Therefore, it is not possible to inspect the archived data without authorization. For this reason, a web based storage service can be utilized for the storage of the archive data without security worries. The cryptography device thereto at the computer system is designed in a way such that a decoding of the data is only possible on a computer system which has been used for encryption. In this way, it is impossible to use a computer system which is constructed in the same way to decipher the archive data applied.

In another preferred embodiment, when the data are encrypted and stored in the archive, an advanced signature takes place in such a way that it contains not only the hash value of the unencrypted original data but also the hash value of the encrypted archive data. It is thereby possible to examine to which extent the data is insecure, also without the access to the cryptography function of the archive computer system.

In order to comply with the requirements of the signature law and the signature ordinance regarding the standard of care of the archiving, in a further embodiment, the generation of a log file takes place by the archive computer system, in which all of the archive accesses are chronicled by the administrator. In addition, a consistence examination of all the stored data, which is started manually or automatically in fixed intervals, takes place and a report is generated. Both the log file and the report file are signed and stored in the archive as the data themselves (also, for example, as pseudo email). An administrator can thus verify whether he has regularly fulfilled his standard of care in a satisfactory manner and whether he as examined the archive for data lost.

The archive method is applicable for each type of data. These types of data include archives for emails that can be automatically recorded in the archive, file archives that function as backup solutions and can thereby document diverse process status, document archives that illustrate an electronic filing from the established text and/or picture documents and in addition to document data, can also, for instance, be created from the data sent to a printer. Furthermore, fax archives or document archives from scanned paper documents also belong to the type of data suitable for the archive method of the current invention. In a preferred embodiment of the present invention, the archived data are stored in a form that is searchable with search functions. For this purpose, a key word generation and deposition in a data base take place, if necessary, after picture files are converted to text files via OCR. The access to both the administrative and operative archive functions and to the archived data themselves takes place preferably over a secure connection (SSL) to a web service, which runs on an archive computer system. Both the access from a LAN and via the internet are possible in this process. Through the application of the user interface in the web browser, the access to the archive can take place without additional software installation and is independent from the operation system utilized by the client.

For the integration of the computer system in the data stream, which enables automatic introduction of the data to be stored into the archive without further user action, there are more alternatives in accordance with the current invention. The way in which the interfaces are integrated into the data stream is significantly dependent on the type of the data to be archived. In the case of an email archive, there are two possible embodiments among others. In one of the embodiments, the archive system is installed between the mail server (such as Sendmail, Microsoft exchange, lotus notes, Novell GroupWise) and the internet gateway or a firewall and forward the incoming and outgoing emails respectively. After that, a copy for the archive will be stored. In the other embodiment, the archive system is supplied with a copy of the transported emails by the mail server. Alternatively, there is a possibility to supervise the filing directory of the mail server for the mails and to transfer copies into the archive from there. This approach has, however, the peril that the original email data are not stored in the directory any more.

For the archiving of the printed documents, a printer driver is a suitable interface to the archive system. The archive system provides a driver, which works before the actual printer driver. Printed data that are sent to the installed printer are copied into the archive by the archive driver and are then forwarded to the printer driver. In this way, all of the printed documents can also be automatically recorded in the archive. For the storage of the documents in paper form, manual recording by the use of a scanner can be resorted to. Here, however, exists also a possibility to employ a driver before the scanner driver as an analogue to the printer driver, which delivers all of the scanned documents to the archive.

For both the printed documents and the scanned documents, a key word generation and a searchable deposit in the data base system take place after they are converted into a text format.

The invention claimed is:

1. A method for long-term archiving of qualifiedly signed data, the method comprising the following steps:
   hashing the data,
   encrypting the data with a cryptography algorithm,
   hashing the encrypted data,
   applying to the hashed data a signature comprised of an advanced time stamp as well as a hash value of the original data and a hash value of the encrypted archive data to form a data stock,
   generating a hash tree over the data stock or a portion thereof,
   signing the hash tree via a qualified time stamp.

2. The method according claim 1, wherein a new signing of the hash tree(s) takes place through a qualified signature in order to maintain the legal validity of the signature of one or more files.

3. The method according to claim 1 wherein the generation of the hash tree takes place at regular intervals, especially daily, over the whole data stock.

4. The method according to claim 1 wherein the generation of the hash tree takes place at regular intervals over the newly added data stock.

5. The method according to claim 1 wherein the data to be stored are emails and the signature is generated in any case over the entire email.

6. The method according to claim 5, wherein the advanced signature is generated in any case over the body of the email including eventually present attachments but without the header.

7. The method according to claim 1 wherein the values of the hash trees are collected in a binary file.

8. The method according to claim 7, wherein the binary hash tree is stored together with the obtained qualified time stamp in the same way as the data which need to be archived.

9. The method according to claim 1 wherein the values of the hash trees are collected in a data base.

10. The method according to claim 1 wherein the data are in parallel hashed in a run with more than one hash algorithm, and the hash values that are created in this manner are stored together with the stamped data as well as a reference to the algorithm applied for the stamp marking.

11. The method according to claim 1 wherein the request of the qualified time stamps for multiple archive clients through a common time stamp server take place in a way such that the hash values that are delivered for stamp marking are collected within a regular time window by the common time stamp server, are catenated after the termination of the time window, which preferably takes place over a hash tree, and are then handed over to a qualified time stamp service for stamp marking, and a data structure, which is furnished with a qualified time stamp and comprises the delivered hash value, is passed back to the archive clients at the next contact.

12. A computer system for long term archiving of qualifiedly signed data according to the method of claim 1 wherein the computer system contains the following features:
   one and/or more interfaces to connect with each server for issuing advanced and/or qualified signatures and time stamps,
   a cryptography device,
   one and/or more mass storage media,
   one and/or more suitable interfaces to the data stream of the data to be archived that is designed in a way such that an automatic archiving can take place.

13. The computer system according to claim 12 wherein the cryptography device is designed in a way such that a decoding of the data is only possible on a computer system which has been used for encryption.

14. The computer system according to claim 12 wherein, when the data to be stored are emails, the computer system is installed between the email server and the internet gateway.

15. The computer system according to claim 12 wherein, when the data to be stored are emails, the computer system is installed at the email server and receives copies of the emails from the email server.

* * * * *